US008369057B2

(12) United States Patent
Bourgeois et al.

(10) Patent No.: US 8,369,057 B2
(45) Date of Patent: Feb. 5, 2013

(54) REMOTE LOCKING ROOF ACCESS HATCH

(76) Inventors: William H. Bourgeois, Bay St. Louis, MS (US); Timothy Paul Salatich, Slidell, LA (US)

( * ) Notice: Subject to any disclaimer, the term of this patent is extended or adjusted under 35 U.S.C. 154(b) by 635 days.

(21) Appl. No.: 12/509,710

(22) Filed: Jul. 27, 2009

(65) Prior Publication Data

US 2010/0107495 A1 May 6, 2010

Related U.S. Application Data

(60) Provisional application No. 61/110,052, filed on Oct. 31, 2008.

(51) Int. Cl.
*H02H 3/22* (2006.01)

(52) U.S. Cl. ........................................................ 361/111

(58) Field of Classification Search .................. 361/111
See application file for complete search history.

(56) References Cited

U.S. PATENT DOCUMENTS 3,465,483 A 9/1969 Miller
4,208,840 A 6/1980 Jentoft et al.
4,333,489 A * 6/1982 Magill et al. .................... 137/77
4,837,986 A 6/1989 Gagne
4,933,615 A 6/1990 Furuya et al.
5,123,875 A 6/1992 Eubank et al.
5,613,333 A 3/1997 Witzig, Jr.
5,638,645 A 6/1997 Lipton
6,572,182 B2 6/2003 Lamparter et al.
2005/0028723 A1 * 2/2005 Ancel .......................... 116/202
2005/0258809 A1 * 11/2005 Karslo .......................... 323/257
2006/0185249 A1 8/2006 Whittlesea et al.
2007/0241709 A1 * 10/2007 Cardwell ...................... 318/484
2009/0133342 A1 * 5/2009 Copeland ........................ 52/202
2010/0031573 A1 * 2/2010 Whiting et al. ................... 49/31

FOREIGN PATENT DOCUMENTS

WO 1997033062 A1 9/1997

* cited by examiner

*Primary Examiner* — Ronald W Leja
(74) *Attorney, Agent, or Firm* — Butler, Snow, O'Mara, Stevens & Cannada PLLC

(57) ABSTRACT

An electronically-activated roof access hatch is described that allows an operator to unlock the roof access hatch safely from the ground before ascending to the roof access hatch. The opening of the roof access hatch is controlled by a control panel that unlocks the roof access hatch and causes the roof access hatch to open.

8 Claims, 11 Drawing Sheets

Panel Cover

REMOTE LOCKING ROOF ACCESS HATCH

FIELD OF THE INVENTION

The present invention is generally directed toward an apparatus for opening a roof access hatch from the ground.

BACKGROUND OF THE INVENTION

Roof hatches provide access to a roof or deck from the area below. Also known as access hatches, these hatches are typically designed to provide access to the roof of a building for servicing of roof-mounted equipment and are sometimes mandated in building codes. Roof access hatches are locked from the inside to prevent intruders from accessing the building through the hatch from above. To unlock the roof access hatch, the operator must climb an access ladder up to the hatch and, while bracing himself with one hand, attempt to unlock and open the hatch with the other hand. Of course, there are safety concerns in that, if his hand slips, the operator may fall several feet resulting in injury or even death. The current invention obviates these concerns by allowing the operator to remotely unlock and open the roof access hatch from the ground before climbing the ladder, thus greatly reducing the risk of injury.

SUMMARY OF THE INVENTION

An electrically operated remote unlocking and opening mechanism for a building roof access hatch is disclosed. A key-operated control panel at a distance remote to the roof access hatch unlocks and opens the roof access hatch so that the person accessing the hatch does not have to release both hands from the ladder. When a person activates the system from the control panel, the control panel directs the locking mechanism to unlock the roof access hatch and then directs the opening mechanism to open the roof access hatch. The system has a battery backup in the event of power failure and could be opened manually in the case of an emergency. Additional safety features may also be incorporated, such as sensors to prevent the hatch from closing while a person is accessing the opening and mechanisms to prevent the hatch from being blown shut by wind gusts.

BRIEF DESCRIPTION OF THE DRAWINGS

Further advantages of the invention will become apparent by reference to the detailed description of preferred embodiments when considered in conjunction with the drawings.

DETAILED DESCRIPTION OF THE PREFERRED EMBODIMENT

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

The electric roof access hatch unlocking and opening system consists of a locking mechanism, an opening mechanism, and a control panel, each more fully described below. Through its electronic circuitry, the control panel controls the actions of the locking mechanism and the opening mechanism.

Figure 1:
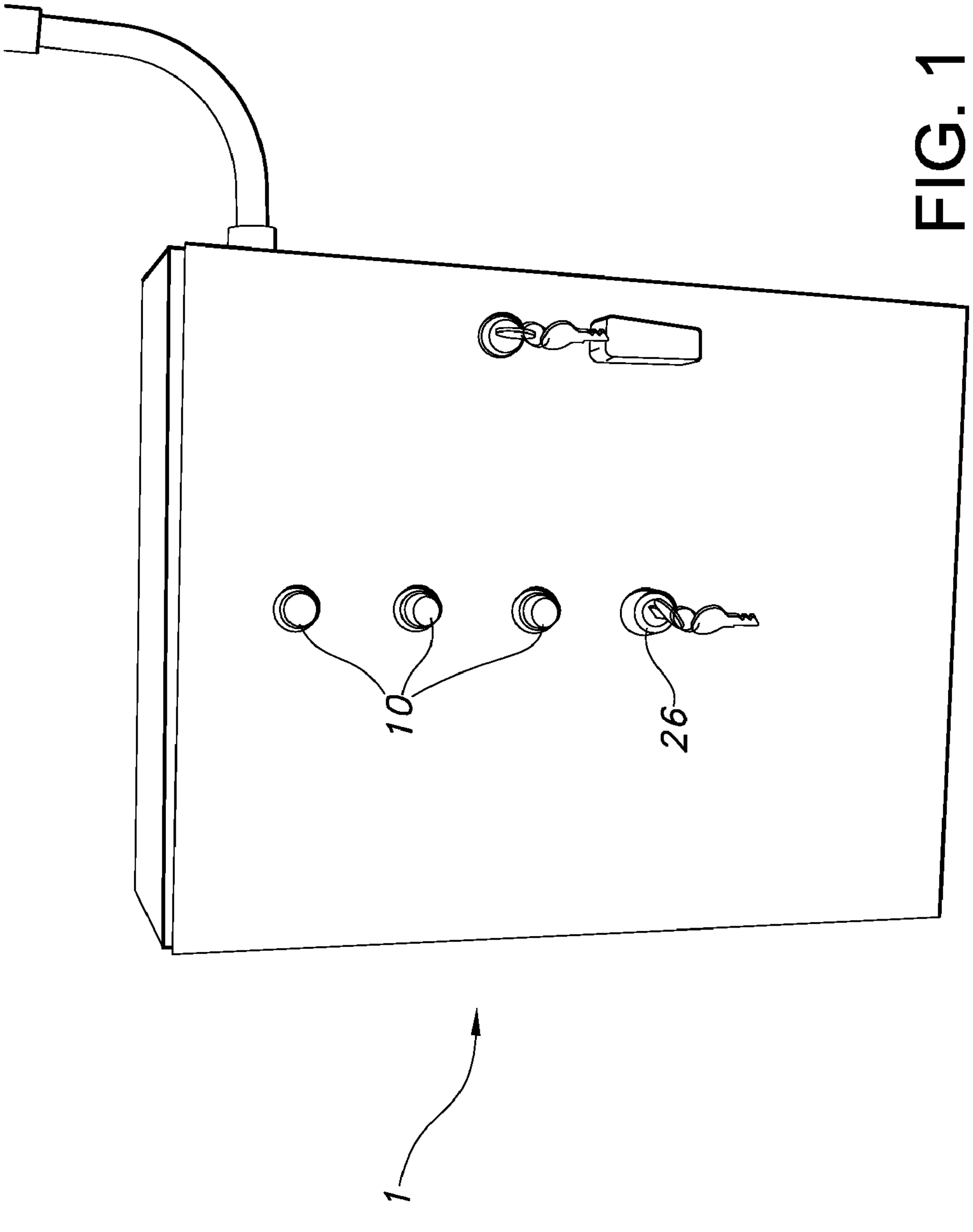
FIG. 1 depicts the remote control panel that activates the roof access hatch.
Figure 2:
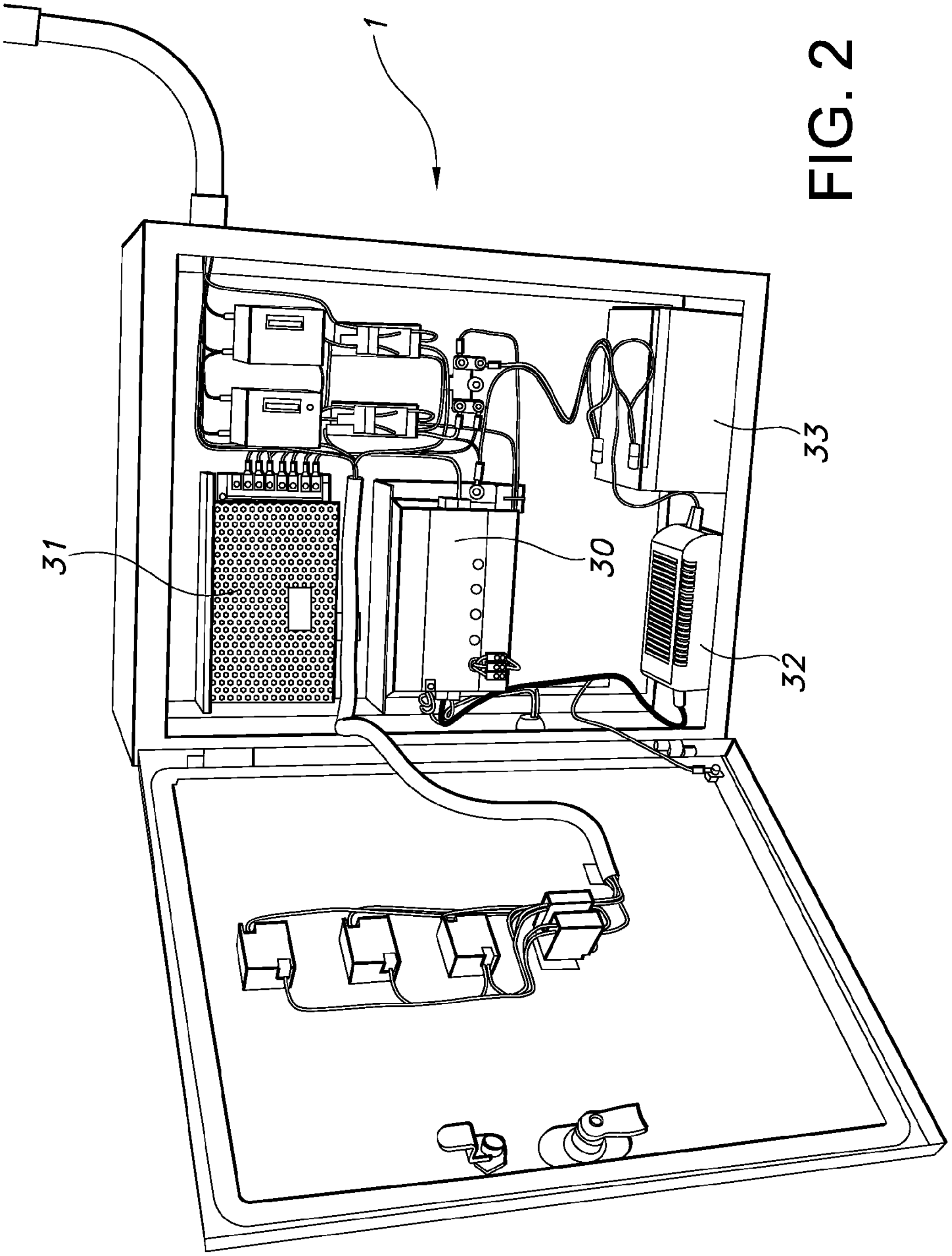
FIG. 2 depicts the interior of the control panel.
Figure 4:
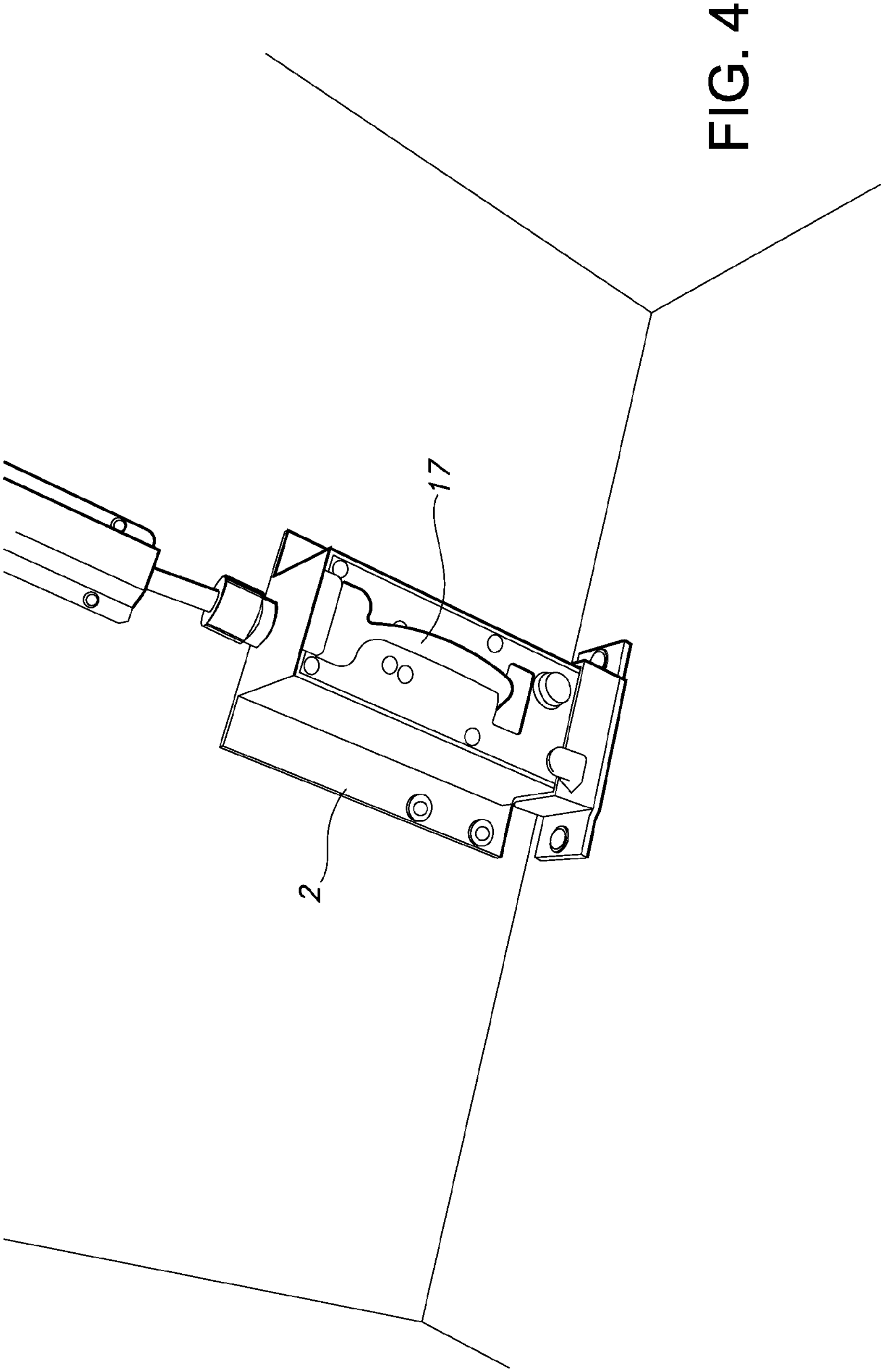
FIG. 4 depicts the locking mechanism for the roof access hatch.
Figure 9B:
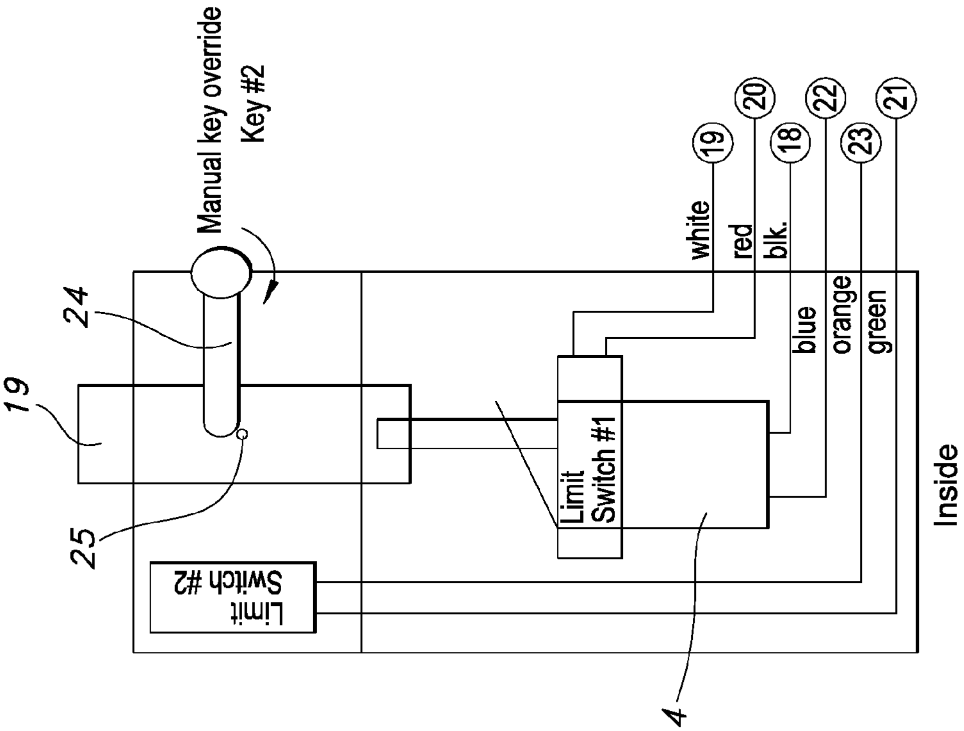
FIG. 9*b* depicts the circuitry and mechanism of the locking mechanism, including the manual override.
Figure 11:
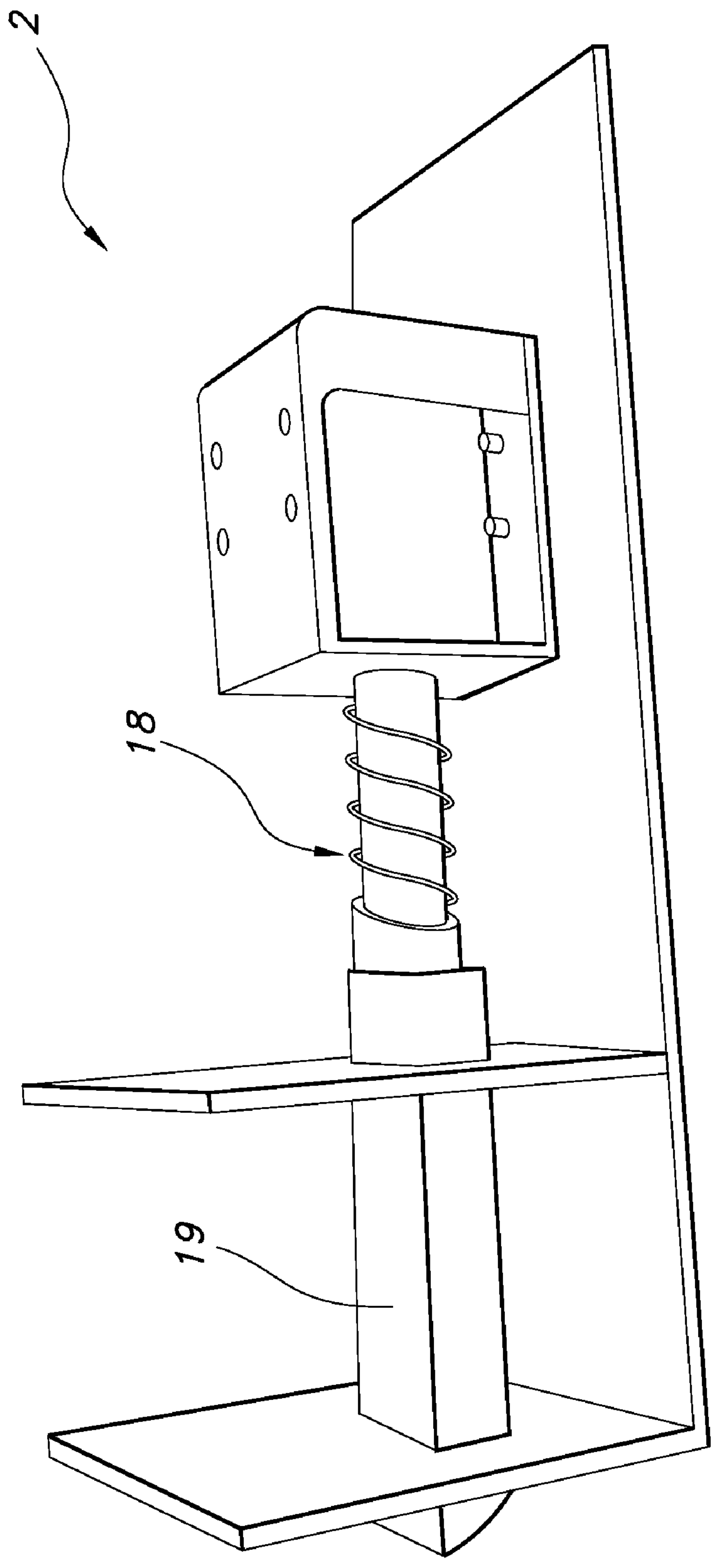
FIG. 11 depicts the locking mechanism of the opening system.

The locking mechanism is a device, as depicted in FIG. 4, FIG. 9, and FIG. 11, which engages a lock on the roof access hatch. It is controlled by the control panel 1 (as depicted in FIG. 1 and FIG. 2) and may either lock or unlock upon application of a current. In the present embodiment, when current is applied, solenoid 4 retracts, pulling latch 19 into a recessed state. The locking system is preferably solenoid driven, as depicted in FIG. 9. However, other electrically-operated locking mechanisms may be used, including, but not limited to, magnetic locks, motor-operated locks, and electric strikes.

Figure 9A:
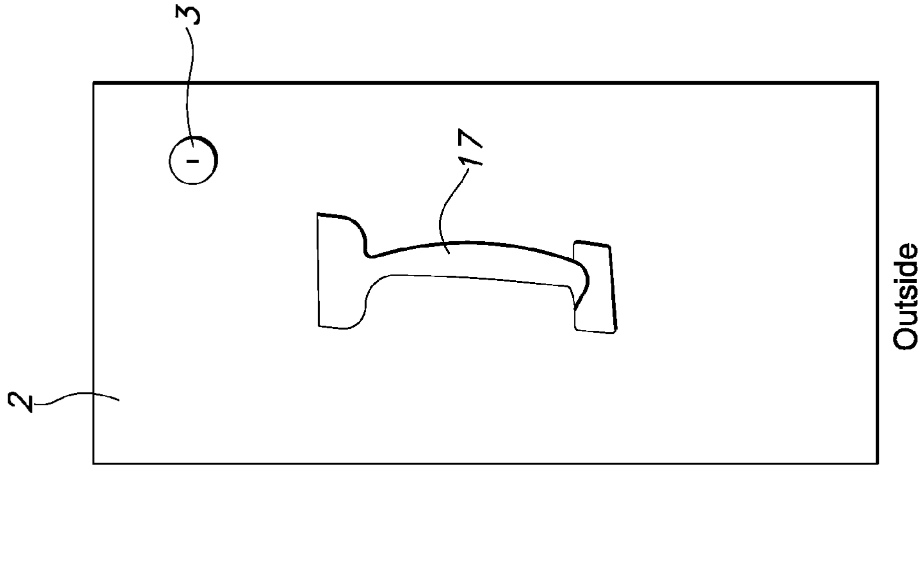
FIG. 9*a* depicts the exterior of the locking mechanism.

The locking mechanism optionally includes a manual key override 3, as depicted in FIG. 9*a*, that allows the locking system to be unlocked in the event of emergency if the control panel circuitry or opening mechanism cannot function properly due to extended power outages or damage to any component. Lever 24 is operatively coupled to the manual key override. Inserting and turning a key in the manual key override 3 causes lever 24 to push against a protrusion 25 on the latch 19, forcing the latch 19 into a recessed state, allowing access hatch 8 to be opened.

Figure 3:
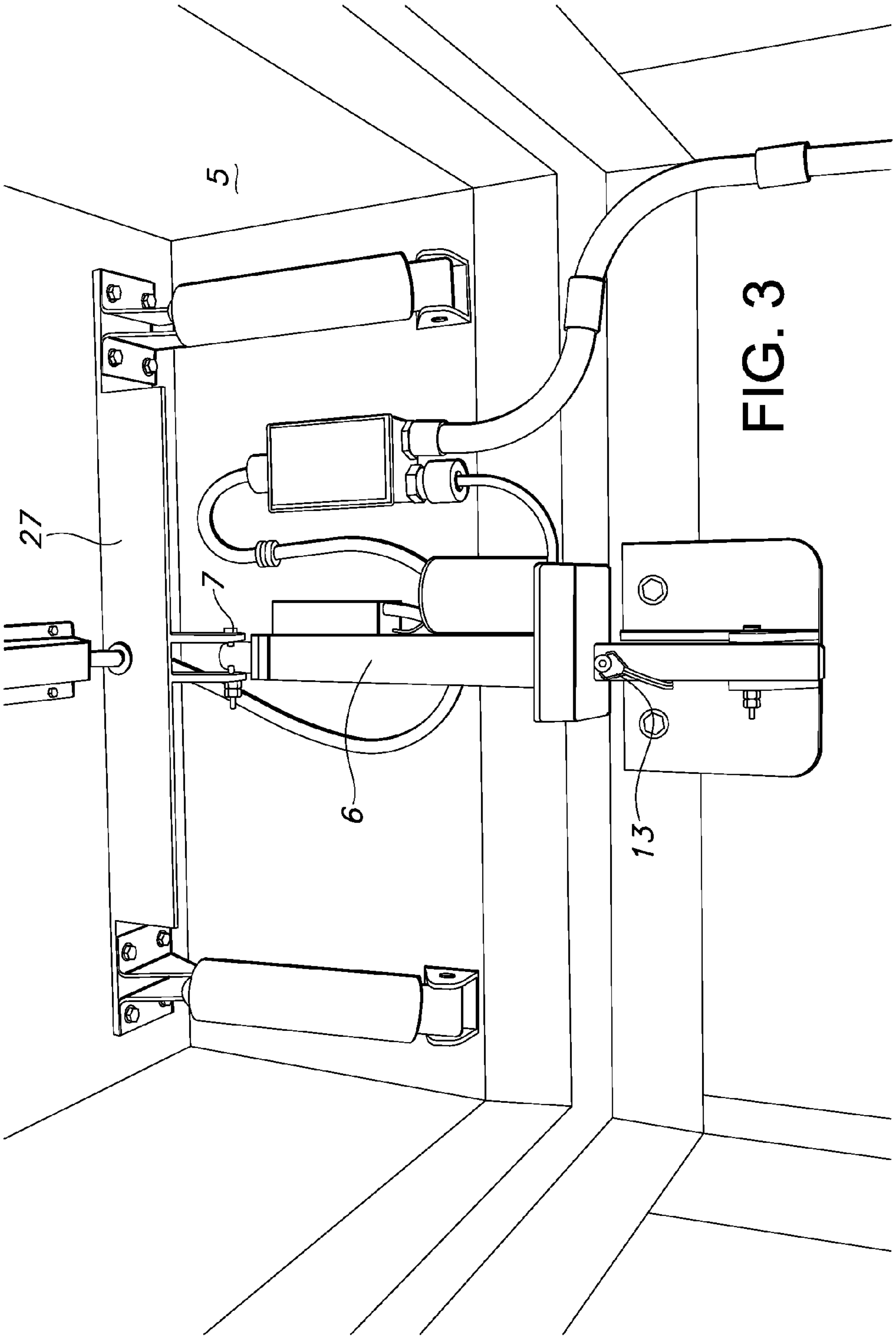
FIG. 3 depicts the opening mechanism for the electrically-operated access hatch.
Figure 5:
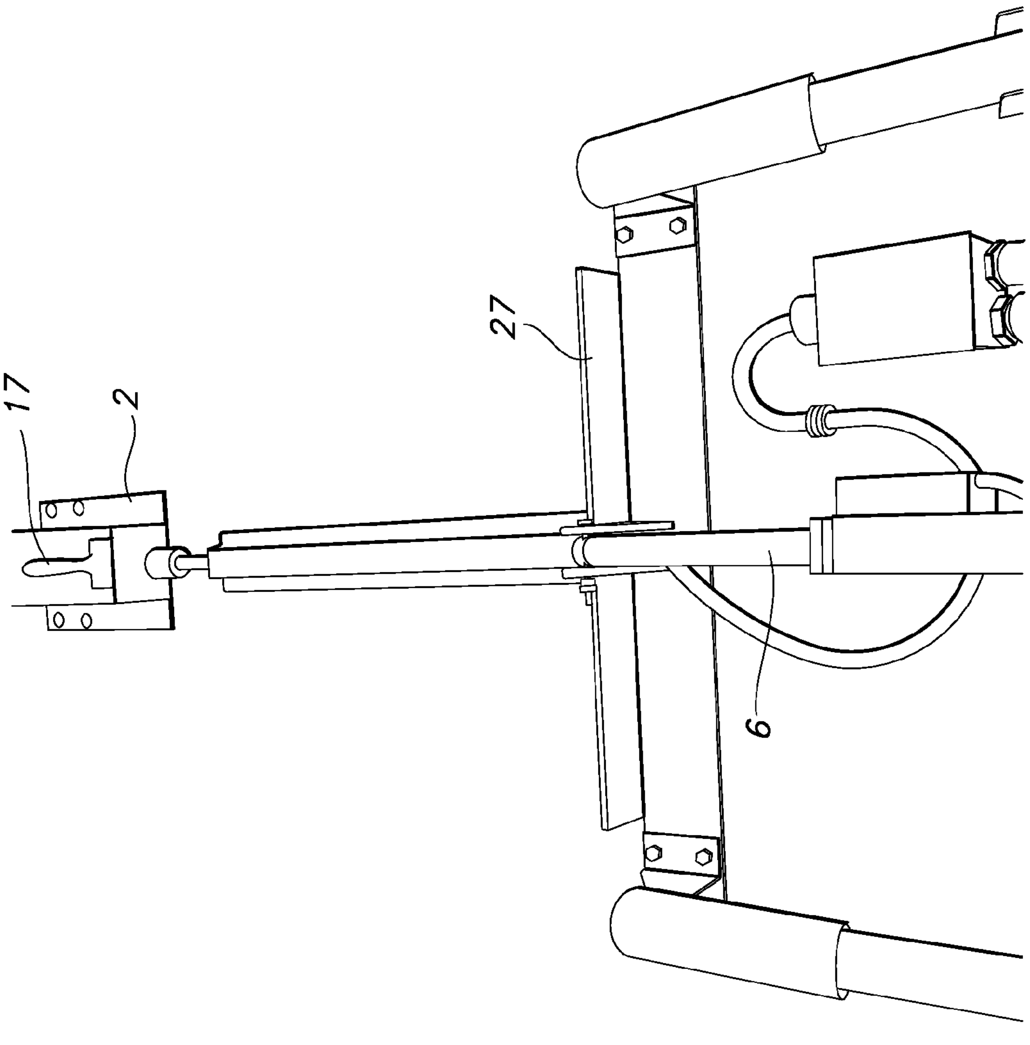
FIG. 5 depicts another view of the opening mechanism for the roof access hatch.

Opening mechanism 5 is depicted in FIG. 3 and in FIG. 5. In the preferred embodiment, the opening mechanism is driven by a linear thrust actuator 6. Linear thrust actuator 6 is coupled to access hatch 8 at a pivot point 7 on angled access hatch mounting bracket 27. Angled access hatch mounting bracket 27 is configured such that pivot point 7 is located at a distance from the hinge side of the roof access hatch. When the control panel circuitry applies power to opening mechanism 5, the thrust rod of linear thrust actuator 6 extends. As the linear thrust actuator 6 extends, it applies a force to pivot point 7. The force of the linear thrust actuator 6 at pivot point 7 causes access hatch 8 to rotate about the axis of the roof access hatch hinge, causing the hatch to lift open from the side opposite the hinges. Other mechanisms for opening the roof access hatch may be used and include electric motors or pneumatic cylinders.

Figure 10:
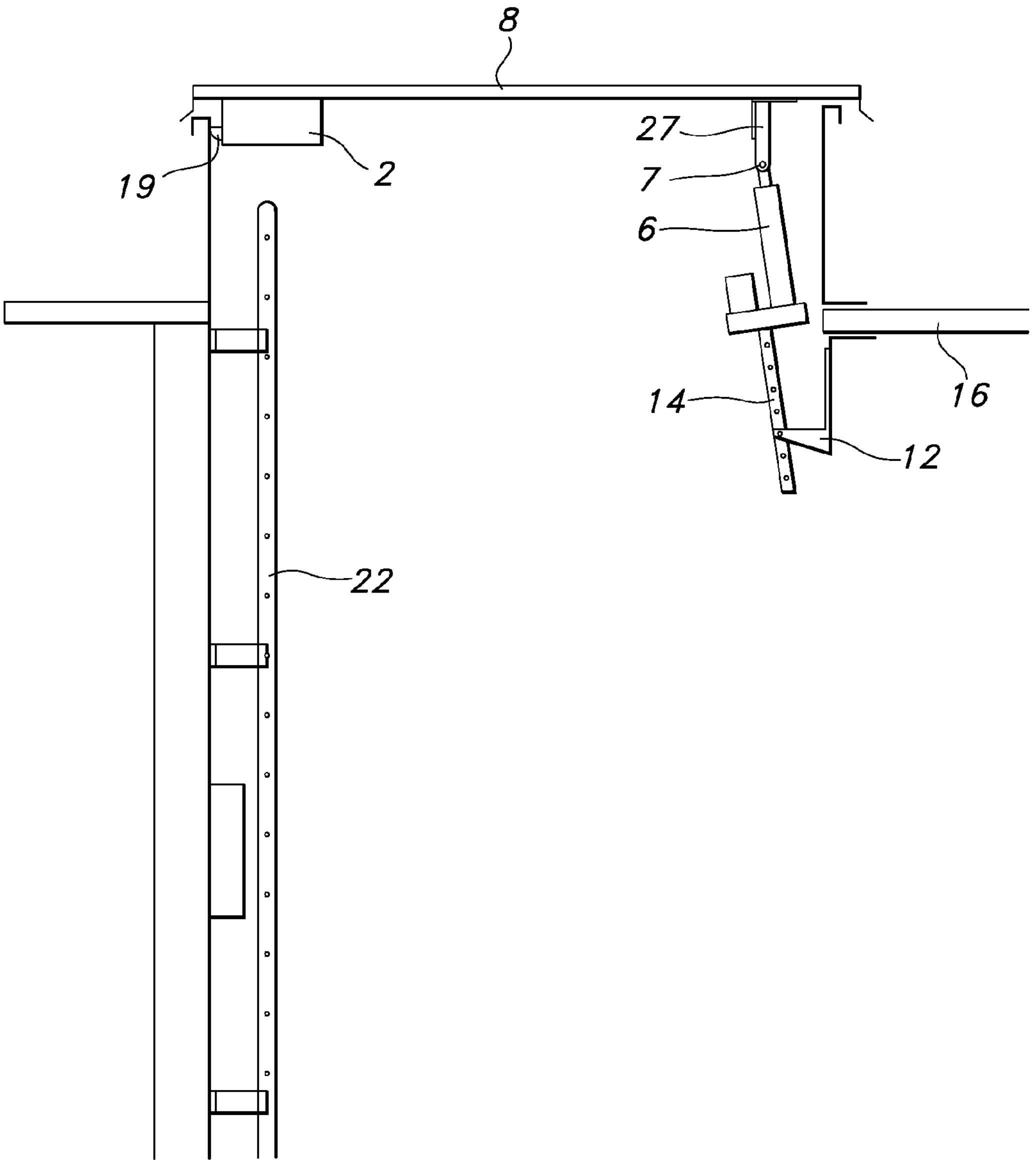
FIG. 10 is a side-perspective of the electrically-operated access hatch.

The opening mechanism 5 may be adjustable to accommodate different angles and mounting positions and varying thicknesses of insulation. As can be seen from FIG. 10, the roof-mounted mounting bracket 12 may be coupled to linear thrust actuator 6 by use of adjustable bracket 14. In the preferred embodiment, the bracket consists of a bar with equally spaced holes along its length. The linear thrust actuator 6 is affixed to the upper end of the adjustable bracket using bracket pin 13. The lower end of adjustable bracket 14 is connected to the roof-mounted mounting bracket 12. The roof-mounted mounting bracket 12 is further securely attached to the underside of the roof decking 16.

To accommodate for varying thicknesses of installations or lowered mounting positions, bracket pin 13 can be inserted into any of the equally spaced holes situated along the length of the bar on the adjustable bracket. Bracket pin 13 can also be removed to disengage the roof access hatch 8 from the opening mechanism 5.

Figure 6:
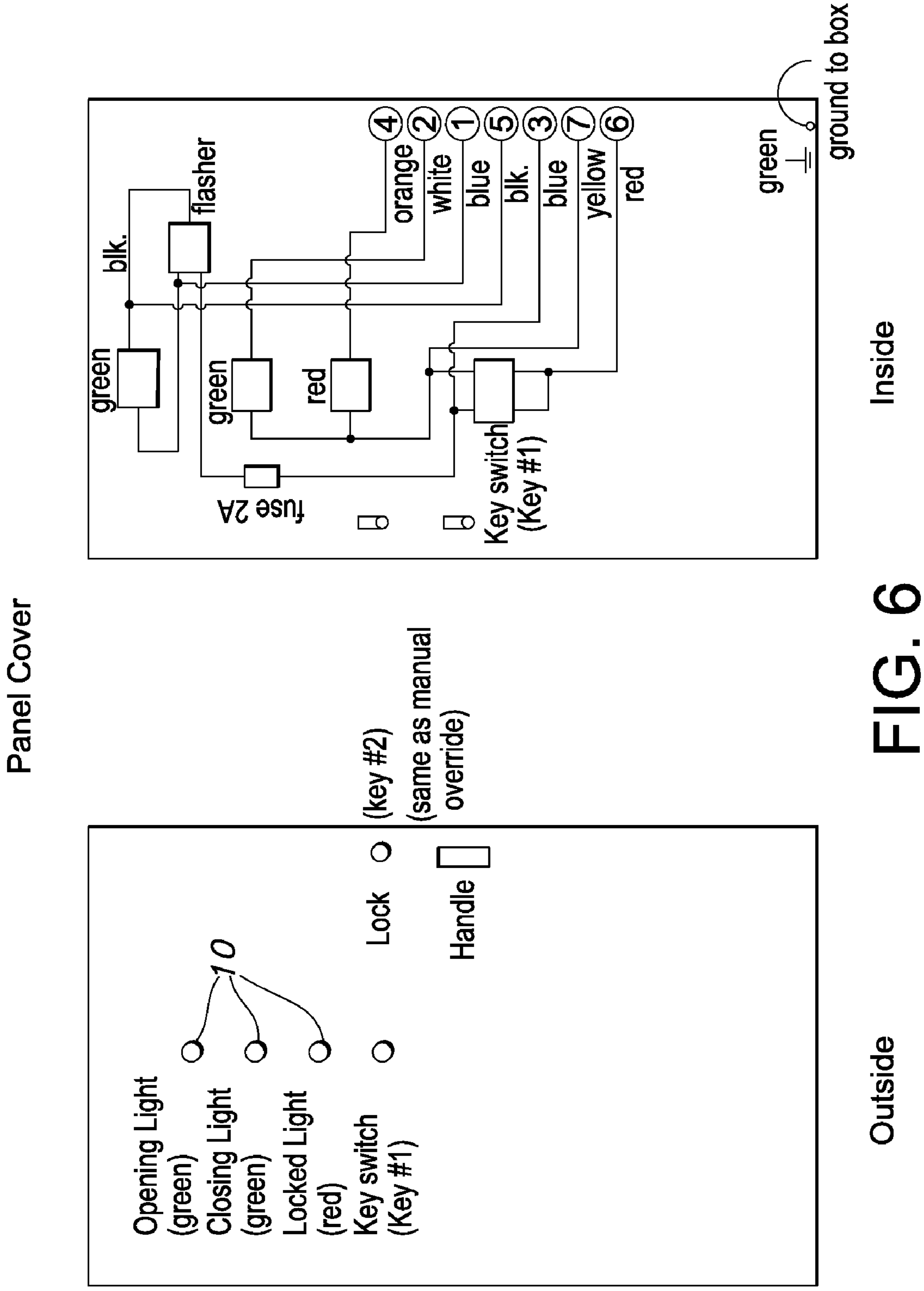
FIG. 6 is a circuit diagram for the control panel lights.
Figure 7:
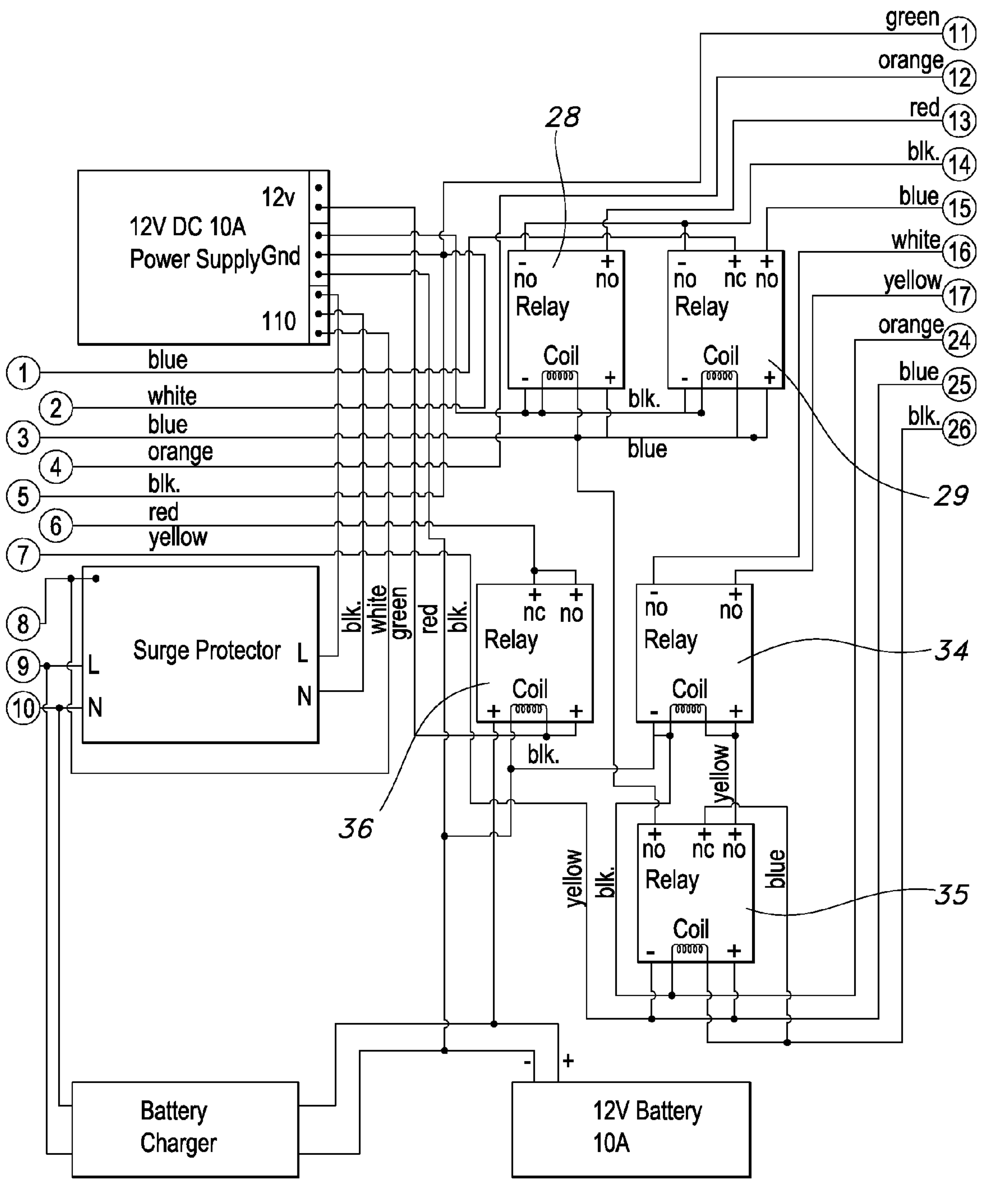
FIG. 7 is a circuit diagram for the control panel.
Figure 8:
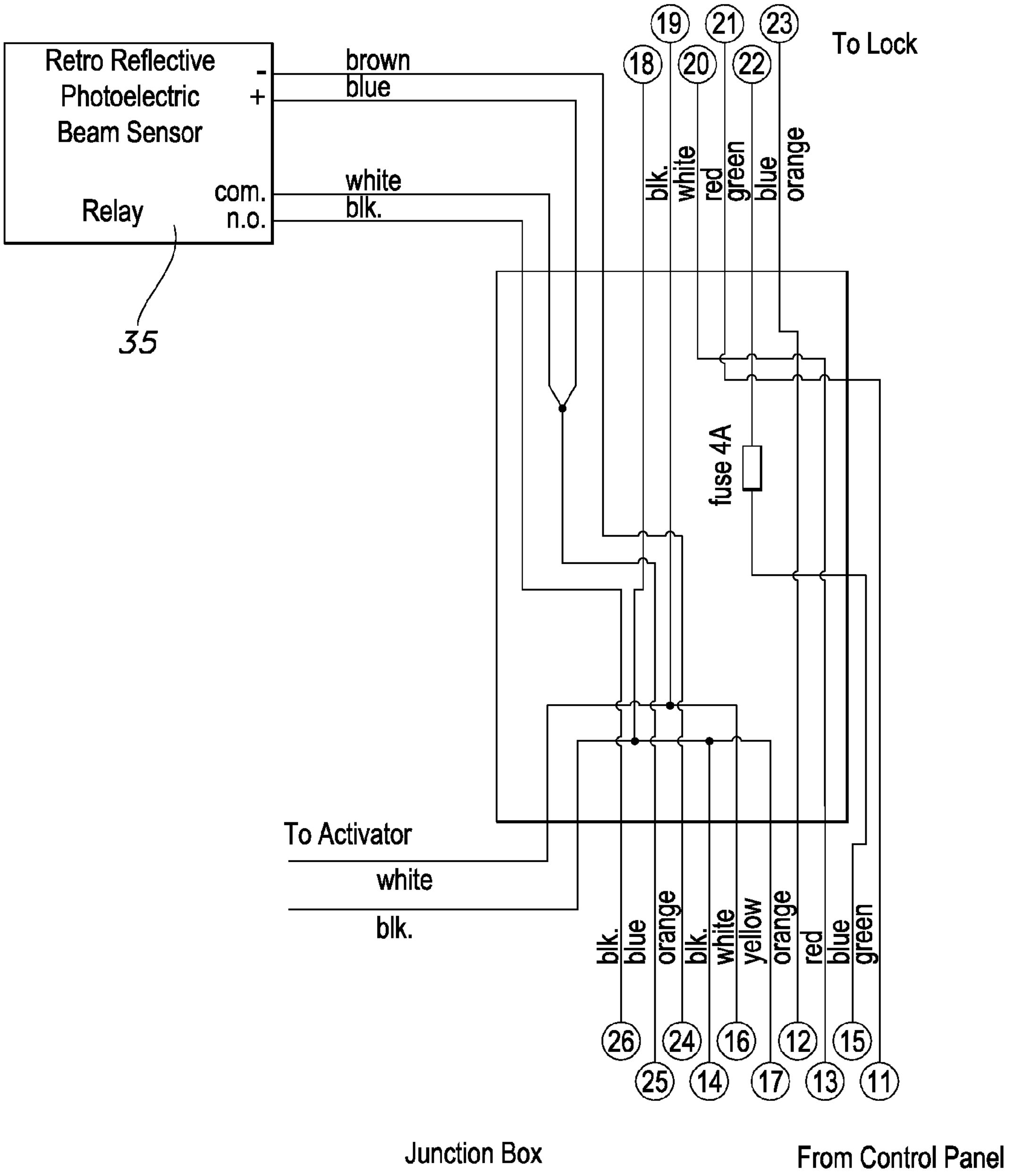
FIG. 8 depicts the wiring from the control panel to the actuators.

Circuitry in the control panel 1 activates the locking mechanism 2 and the opening mechanism 5. Although various methods of providing power to the locking and opening mechanisms are known and may be used, a simple circuit is disclosed herein. An example of such a circuit can be seen in FIG. 6, FIG. 7, and FIG. 8. Control panel 1 can be placed into different modes of operation as the operator desires. In the OPEN mode, the control panel circuitry directs the roof access hatch to open. In the CLOSED mode, the control panel circuitry directs the roof access hatch to close. The OFF position is the default position to be used when the roof access hatch is not being utilized. In the preferred embodiment, the various modes are selected by use of a key switch 26. As seen in FIG. 1, status lights 10 on the front of the control panel 1, may indicate the current mode of operation of the roof access hatch 8.

When control panel 1 is placed in OPEN mode, power is applied to open relay 28 that sends power to the opening mechanism 5 and to a lock relay 29 for limited duration sufficient to unlock the locking mechanism 2. The lock relay 29 transmits power to the locking mechanism 2, causing it to unlock. In the current embodiment, this is a delay-on-break relay. This lock relay 29 keeps the latch 19 recessed until the hatch access 8 begins to open. Open relay 28 is set to output power to the linear thrust actuator 6 at a time after the lock relay 29 has unlocked the roof access hatch 8, but before the flow of current to the locking mechanism 2 is terminated. In the preferred embodiment, the open relay 28 is a delay-on-make relay. When the open relay 28 permits current to flow, power is transmitted to the linear thrust actuator 6 in the opening mechanism 5, causing the opening mechanism to lift open the roof access hatch 8. The open relay 28 stops transmitting power after a duration sufficient for the linear thrust actuator 6 to fully open the roof access hatch 8. The duration will vary based on the size and weight of the roof access hatch. Limit switches may be used on the roof access hatch to prevent the opening mechanism from forcing the roof access hatch beyond the fully open position.

When control panel 1 is placed in CLOSE mode, power is applied to the close relay 34. The close relay 34 transmits current to the linear thrust actuator 6 with the polarity reversed such that the linear thrust actuator 6 returns to a retracted state, pulling the roof access hatch 8 closed. The close relay 34 transmits power only for a duration sufficient to close the roof access hatch. The spring loaded latch 19 on the locking mechanism 2 secures the roof access hatch 8 in a locked position when the roof access hatch 8 is in a fully closed position.

The control panel 1 is placed into either the OPEN mode, CLOSE mode, or OFF mode by use of a switch. In the preferred embodiment, a key switch 26 is used to place the control panel into one of the three modes, allowing the operator to remove the key for security purposes. Other known access control devices may be used to place the control panel into its various modes, including, but not limited to, pushbutton operation, biometric means, or computer-based access control. Indicator lights 10 on the front of the control panel 1 may be used to indicate the status of the electrically-operated access hatch 8, such as whether the roof access hatch 8 is opening or closing and whether the lock is engaged.

Current is supplied to control panel 1 from an exterior source, such as a standard power outlet. The control panel 1 may optionally house a surge protector 30, as seem in FIG. 2, to protect the circuitry of the control panel 1 from electrical spikes. The current is transmitted to a DC transformer 31 that converts incoming power to a DC current. In the preferred embodiment, the transformer outputs 12V DC. However, any voltage may be adapted for use in the system.

The control panel optionally includes a battery charger 32 and battery 33. The battery 33 provides emergency back-up power if the external power source fails. This allows the operator to use the roof access hatch 8 as an emergency egress if there is a power failure. Backup power relay 36 switches the source of power from the DC transformer 31 to the battery 33 in the event of a power outage.

The opening mechanism 5 optionally has an emergency release that allows the roof access hatch 8 to be separated from the opening mechanism 5 in the event that manual operation is required in an emergency. In the preferred embodiment, the emergency release is bracket pin 13 that may be removed from adjustable bracket 14 causing the linear thrust actuator 6 to disconnect from roof-mounted mounting bracket 12.

In the event of an emergency, such as a malfunction or damage to the claimed device, or when the emergency battery 33 is depleted of reserve power during extended power outages, the roof access hatch can be manually opened. To open the roof access hatch 8, the manual override key 3 is turned to unlock locking mechanism 2, and bracket pin 13 is removed from adjustable bracket 14. The roof access hatch 8 can then freely open.

To close the roof access hatch 8 in the event of an emergency, the roof access hatch 8 can be pulled closed manually. To do so, linear thrust actuator 6 must be disengaged from adjustable bracket 14 by removal of bracket pin 13. The roof access hatch 8 can then be pulled shut using handle 17 which is preferably affixed to the outside of locking mechanism 2. However, the handle 17 can be located anywhere on the roof access hatch 8. As the roof access hatch 8 is pulled closed, the latch 19 on the locking mechanism is pushed inward toward the roof access hatch hinge. The latch 19 is springloaded by means of spring 18 so that latch 19 returns to its fully extended state once access hatch 8 is in the fully closed position.

Under normal operating conditions, the linear thrust actuator 6 maintains access hatch 8 in the open position while the operator is on the roof. The roof access hatch will not blow closed in gusty winds while the linear thrust actuator is in the open position. However, when the roof access hatch is opened manually by removal of bracket pin 13, a prop bar similar to that used to keep the hood of a vehicle open can be used to keep the roof access hatch open. This prop bar will prevent the operator from being trapped on the roof by preventing the closure of the roof access hatch.

The electrically-operated access hatch 8 may also optionally include safety features to prevent accidental closure of the roof access hatch while a person is accessing the hatch. Sensors may be mounted to detect the presence of a person near the opening mechanism of the roof access hatch. In the preferred embodiment, a retro reflective photoelectric beam sensor is employed to ensure that a person is not injured by a closing roof access hatch. The retro reflective photoelectric beam sensor is mounted on the wall near the hinge side of the roof access hatch 8. A reflector placed on the wall near the ladder 22 reflects emitted light back to the light sensor of the retro reflective photoelectric beam sensor. A person or object near the roof access hatch would prevent emitted light from reflecting back to the retro reflective photoelectric beam sensor. The retro reflective photoelectric beam sensor is configured to cause the control panel 1 to interrupt power to the linear thrust actuator 6 whenever light is not reflected back, indicating the presence of a person or object near the roof access hatch 8. This is handled by the safety relay 35 in control panel 1 that directs power to the open relay 28 if the light is not reflected back to the retro reflective photoelectric beam sensor. The roof access hatch will cease closing and will enter OPEN mode.

The circuitry disclosed in this application is one possible embodiment of the invention. However, it is evident to a person of ordinary skill in the art that the circuitry can be designed in many variations to operate the opening and locking mechanisms of the roof access hatch. Specifically, a computer board or digital circuitry may be used that performs the same functions as the circuitry disclosed.

The electric roof access hatch unlocking and opening system can be mounted to a roof access hatch 8 that is already installed in a building. Alternatively, the electric roof access hatch unlocking and opening system may be part of a kit that includes the roof access hatch 8 and any accessories such as a ladder 22.

It should be understood that features of any of these embodiments may be used with another in a way that will now be understood in view of the foregoing disclosure. Although the present invention has been described and illustrated with respect to at least one preferred embodiment and use therefor, it is not to be so limited since modifications and changes can be made therein which are within the fully intended scope of the invention.

We claim:

1. An electronically-activated roof access hatch comprising:

a. an electric locking mechanism to lock or unlock a roof access hatch;

b. an electrically-powered opening mechanism to open or close said roof access hatch; and c. a control panel that controls the operation of said electric locking mechanism and said electrically-powered opening mechanism, wherein said control panel further comprises a battery as a back-up power source, and further wherein said control panel is operated by turning a key.

2. The electronically-activated roof access hatch of claim 1 wherein said electric locking mechanism includes a manual key override to allow manual unlocking of said locking mechanism.

3. The electronically-activated roof access hatch of claim 1 wherein said control panel includes a surge protector to protect internal circuitry from power spikes.

4. The electronically-activated roof access hatch of claim 1 further comprising a safety sensor configured to prevent injury to a person accessing said electronically-activated roof access hatch.

5. The electronically-activated roof access hatch of claim 4 wherein said safety sensor is a retro reflective photoelectric beam.

6. A kit for an electronically-activated roof access hatch comprising:

a. a roof access hatch;

b. an electric locking mechanism to lock or unlock said roof access hatch;

c. an electrically-powered opening mechanism to open or close said roof access hatch;

d. a control panel that controls the operation of said electric locking mechanism and said electrically-powered opening mechanism, wherein said control panel further comprises a battery as a back-up power source and is operated by a key.

7. The kit of claim 6, further comprising a ladder.

8. A method of accessing a roof hatch comprising:

a. activating an electronically-activated roof hatch from the ground by way of a control panel further comprising a battery as a back-up power source and is operated by a key;

b. waiting for the hatch to begin opening; and c. accessing the roof through the roof access hatch.

* * * * *